(12) United States Patent
Lovas et al.

(10) Patent No.: US 12,493,870 B2
(45) Date of Patent: *Dec. 9, 2025

(54) INTEGRATING EXTENSIONS AND CUSTOMIZATIONS ON BLOCKCHAIN WALLETS

(71) Applicant: Ava Labs, Inc., New York, NY (US)

(72) Inventors: Gergely Lovas, Kecskemét (HU); Nicholas John Mussallem, San Rafael, CA (US)

(73) Assignee: Ava Labs, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/094,046

(22) Filed: Mar. 28, 2025

(65) Prior Publication Data

US 2025/0225504 A1 Jul. 10, 2025

Related U.S. Application Data

(63) Continuation of application No. 18/614,504, filed on Mar. 22, 2024, now Pat. No. 12,265,956.

(Continued)

(51) Int. Cl.
*G06Q 20/36* (2012.01)
*G06F 9/445* (2018.01)
(Continued)

(52) U.S. Cl.
CPC ......... *G06Q 20/36* (2013.01); *G06F 9/44526* (2013.01); *G06F 9/541* (2013.01); *G06F 9/547* (2013.01); *G06Q 20/389* (2013.01)

(58) Field of Classification Search
CPC ................. G06F 21/53; G06F 9/45558; G06F 2009/45587; G06F 9/44526
See application file for complete search history.

(56) References Cited

U.S. PATENT DOCUMENTS

| | | | |
|---|---|---|---|
| 12,265,956 B2 * | 4/2025 | Lovas | G06F 9/541 |
| 2013/0190080 A1 * | 7/2013 | Bibbey | G07F 17/3227 |
| | | | 463/29 |

(Continued)

OTHER PUBLICATIONS

International Search Report and Written Opinion for International Patent App. No. PCT/US2024/021223, mailed Jun. 3, 2024 (10 pages).

(Continued)

*Primary Examiner* — Brian W Wathen
(74) *Attorney, Agent, or Firm* — McDermott Will & Schulte LLP

(57) ABSTRACT

Various aspects of the subject technology relate to systems, methods, and machine-readable media for extending and customizing a blockchain wallet. Various aspects may include providing, to users of a blockchain platform, a blockchain wallet configured to provide standard services to the users, and, providing, to the users, a sandbox environment that only communicates with the blockchain wallet through a secure message gateway. Aspects may also include storing, in the sandbox environment, a plugin configured to provide add-on services, and executing the plugin within the sandbox environment to enable the plugin to provide, as an extension of the blockchain wallet through the secure message gateway, the add-on services to the plurality of users.

22 Claims, 9 Drawing Sheets

Related U.S. Application Data

(60) Provisional application No. 63/492,203, filed on Mar. 24, 2023.

(51) Int. Cl.
*G06F 9/54* (2006.01)
*G06Q 20/38* (2012.01)

(56) References Cited

U.S. PATENT DOCUMENTS

| | | |
|---|---|---|
| 2017/0353309 A1 | 12/2017 | Gray |
| 2018/0130050 A1 | 5/2018 | Taylor et al. |
| 2018/0329581 A1* | 11/2018 | Liu ................. G06F 16/957 |
| 2019/0294779 A1* | 9/2019 | Suneja ............. G06F 9/45545 |
| 2020/0219094 A1* | 7/2020 | Dikhit ................ H04L 9/0822 |
| 2021/0049591 A1 | 2/2021 | Lamesh |
| 2021/0056541 A1* | 2/2021 | Kim .................. G06Q 20/02 |
| 2021/0165668 A1* | 6/2021 | Verma ................... G06F 8/20 |
| 2021/0342800 A1 | 11/2021 | Tang |
| 2022/0261259 A1* | 8/2022 | Ganchev ............... G06F 9/452 |
| 2022/0391872 A1 | 12/2022 | Sharma |
| 2023/0102514 A1* | 3/2023 | Kirmse ................ G06F 16/21 |
| | | 707/792 |
| 2023/0129900 A1* | 4/2023 | Jakobsson ............ H04L 9/3263 |
| | | 726/4 |
| 2023/0185364 A1* | 6/2023 | Nickerson ............. G06T 19/006 |
| | | 345/633 |
| 2023/0260037 A1* | 8/2023 | Mussallem ........ G06Q 20/3827 |
| | | 705/35 |
| 2024/0143344 A1* | 5/2024 | Campos ............. G06F 9/44526 |

OTHER PUBLICATIONS

Popchev, I., et al., Towards blockchain wallets classification and implementation. International Conference Automatics and Informatics '2023, Oct. 5-7, 2023, Varna, Bulgaria (ICAI'23), 6 pages.

* cited by examiner

INTEGRATING EXTENSIONS AND CUSTOMIZATIONS ON BLOCKCHAIN WALLETS

CROSS REFERENCE TO RELATED APPLICATIONS

This application claims priority under 35 U.S.C. § 120 as a continuation of U.S. patent application Ser. No. 18/614,504, filed Mar. 22, 2024, which claims the benefit of U.S. Provisional Patent Application No. 63/492,203, to Lovas et al., filed on Mar. 24, 2023, the disclosures of all of these applications and patents are incorporated by reference herein.

TECHNICAL FIELD

The present disclosure generally relates to extending blockchain wallets and adding custom functionality without introducing security risks to the user. More specifically, the present disclosure relates to methods for allowing companies/developers to write channel specific applications, adding customized functionalities which may be used as added plugins to a blockchain wallet.

BACKGROUND

A blockchain is a database that maintains records for transactions and tracking of assets in blocks associated with users distributed across a blockchain network. A blockchain wallet allows the distributed users in the blockchain network to store, send, receive, and manage their digital assets on the blockchain. A blockchain wallet allows users to send, receive, store, and exchange value on a blockchain, as well as monitor and manage the value of their assets on the blockchain.

SUMMARY

According to some embodiments, a method for extending and customizing a blockchain wallet, includes: providing, to a plurality of users of a blockchain platform, a blockchain wallet configured to provide a first plurality of standard services to the plurality of users; providing, to the plurality of users, a sandbox environment that only communicates with the blockchain wallet through a secure message gateway; storing, in the sandbox environment, a plugin configured to provide a second plurality of add-on services; and executing the plugin within the sandbox environment to enable the plugin to provide, as an extension of the blockchain wallet through the secure message gateway, the second plurality of add-on services to the plurality of users.

According to some embodiments, a non-transitory computer-readable medium stores a program for extending and customizing a blockchain wallet, which when executed by a computer, configures the computer to: provide, to a plurality of users of a blockchain platform, a blockchain wallet configured to provide a first plurality of standard services to the plurality of users; provide, to the plurality of users, a sandbox environment that only communicates with the blockchain wallet through a secure message gateway; store, in the sandbox environment, a plugin configured to provide a second plurality of add-on services; and execute the plugin within the sandbox environment to enable the plugin to provide, as an extension of the blockchain wallet through the secure message gateway, the second plurality of add-on services to the plurality of users.

According to some embodiments, a system for extending and customizing a blockchain wallet, comprising: a processor; and a non-transitory computer readable medium storing a set of instructions, which when executed by the processor, configure the processor to: provide, to a plurality of users of a blockchain platform, a blockchain wallet configured to provide a first plurality of standard services to the plurality of users; provide, to the plurality of users, a sandbox environment that only communicates with the blockchain wallet through a secure message gateway; store, in the sandbox environment, a plugin configured to provide a second plurality of add-on services; and execute the plugin within the sandbox environment to enable the plugin to provide, as an extension of the blockchain wallet through the secure message gateway, the second plurality of add-on services to the plurality of users.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
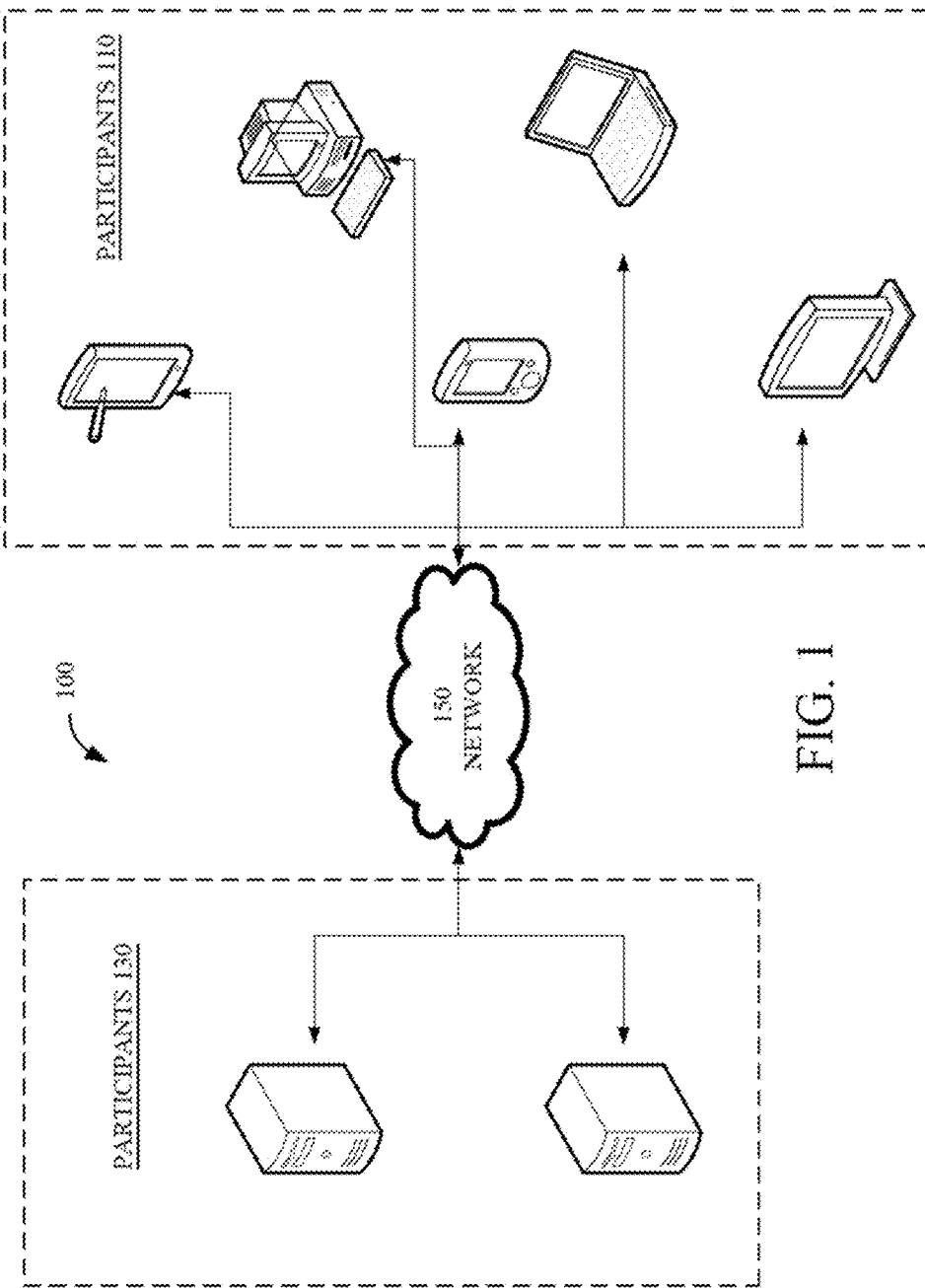
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

Blockchain platforms, such as for smart contracts, may require a consensus protocol as a fundamental building block for building distributed systems. As an example, a blockchain platform can include multiple blockchains, such as a component exchange blockchain for creating and trading digital smart assets, a metadata blockchain for coordinating validators as well as tracking and creating subnets, and a contract blockchain for creating smart contracts across the entire blockchain network. Blockchain wallets run on a blockchain and store transactions relating to specific addresses or public and private keys. Private and public key pairs may be connected cryptographically to secure the blockchain wallet. Blockchain wallets may be associated with a public key and a private key. As an example, blockchain wallet addresses may be generated for each transaction using the public key. When sending (or receiving) transactions through the blockchain wallet, only the private key associated with the public key may be used to decrypt the information encrypted by the sender. Blockchain wallets may also implement other security measures to further increase the security and privacy of transactions. As such, blockchain wallets allow peer-to-peer communications and secure transactions between distributed users. The benefits of blockchain wallets may also be utilized by companies or developers. Such use cases may require more customized features and applications necessary for channel specific companies (e.g., government agencies, healthcare, gaming, etc.) that would not make sense to have widely available a standard version of the blockchain wallet. An approach for wallet customization may include copying a blockchain wallet and then customizing the functionality of the blockchain wallet according to a company's desired functions. However, there is no easy way to copy a blockchain wallet and then customize the functionality, look, and/or feel of the wallet for a specific company, and thus would not make this a cost/time efficient approach.

As a result of this, it may be advantageous and a technological improvement for blockchain wallets to include decentralized wallet plugins that may be added to a blockchain wallet. To resolve the above technical problem, aspects of embodiments relate to systems, methods, and machine-readable media that provide the ability to extend blockchain wallets and add custom functionalities without introducing security risk. This allows other companies/developers to write channel specific applications while leveraging the existing blockchain wallet as a base application. This will provide the ability to extend the wallet, reach the market faster, address channel specific use cases, and maintain security guarantees of the blockchain.

In some embodiments, the plugins (equivalently referred to herein as "integrations") will be store as a built bundle (e.g., compiled code or library) on an agreed upon server, and an inline frame (abbreviated as "iframe") will be placed into the wallet at a pre-arranged entry point. The iframe is an HTML element that allows the loading of another HTML page within a parent document or web object (e.g., the wallet), and may operate as a complete and separate browsing environment, capable of loading its own JavaScript and CSS separately from the parent site (e.g., the wallet). When that iframe is shown, then the plugin code/bundle will be requested and executed within its own runtime environment. Once loaded, the integration may have an Application Programming interface (API) available to communicate with the wallet itself. While limited, the API may allow for things like requesting signing and getting certain data so that the integration can display correctly. In some embodiments, the integration would not automatically run within the wallet, but would instead be offered as an item that can be added to the wallet. Once the user selects to allow the integration, it would be included in the predefined space.

Some embodiments provide a custom skinned subnet that pulls custom style sheets (CSS) from the wallet provider to provide visual styling to the plugin that matches the wallet's visual styling. In some embodiments, multiple skins may be available for the user to select from. In some embodiments, the same skin is synchronized across web, mobile, and devices for the same user or account.

Some embodiments provide custom parsed and skinned transactions, by working with dApps to get parsers that attached required data, and provides instructions where to get the data display layer from an external server. In some embodiments, widgets are provided to hand off the data and lock them into an iframe. Control over the sign button and the actual data that is being signed would be retained by the wallet provider, in some such cases.

Some embodiments provide widget integration so that dApps may push the widget enable from their app and install/enable it in the wallet.

FIG. 1 is a block diagram of a device operating environment with which aspects of the present disclosure can be implemented. FIG. 1 illustrates an exemplary network architecture 100 to provide a blockchain platform (e.g., blockchain network implementation/deployment platform) for managing the proposal of blocks to be added to a blockchain, according to some embodiments. The blockchain may be a linear chain of blocks of the same dimension, such as the same height, size, length, etc. Blocks of the blockchain may comprise or store data or organized information (e.g., records of information), including a cryptographic hash of the previous block, a timestamp, and transaction data, for example. The network architecture 100 of FIG. 1 includes one or more participants 110 and one or more participants 130 which are communicatively coupled through the network 150. The blockchain architecture of the network architecture 100 can be a distributed database that maintains a continuously growing list of ordered records as the blocks. The blockchain architecture may implement methods and systems according to one or more embodiments (e.g., customizing a blockchain using plugins). It is understood that the participants 130 may include the participants 110 as well, such that they are peers.

For example, the participants 110/130 may be clients of the blockchain platform for creating, expanding, or otherwise modifying customized blockchain networks and/or private or public subnets. As an example, the participants 110 may be different computers linked by the network 150 in a blockchain network having a same database. As an example, the participants 110 can function as validators or proposers to propose or add blocks to an existing blockchain. As an example, the participants 110 may be virtual machines (VMs) that form nodes of the blockchain network architecture 100. The participants 110 that function as nodes can run software to verify block and transaction data, store data, validate, respond to network requests for data, and/or the like for the existing blockchain. VMs can be computers that run on blockchain and allow smart contracts from multiple sources to interact with one another. The participants 110 can generate blocks upon request by the participants 130, such as via a consensus engine or module of the participants 130 at a particular time such as during a specified temporal submission window. The blocks being generated and proposed for addition to the existing blockchain may be validated as being a valid block before its addition.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The participants 110 can be controlled by users as a set of validator nodes for making decisions in tandem, such as for facilitating operation or design of the blockchain implementations of the blockchain platform.

As discussed herein, the blockchain network architecture 100 can incorporate application of a consensus protocol that is high throughput, totally-ordered, and effective for smart contracts. Smart contracts may refer to self-executing computer programs, applications, or contracts for executing transactions such as financial transactions involving cryptocurrency. The blockchain network architecture 100 may be used for creation of custom blockchains (including private blockchains) and decentralized applications (dApps). The consensus protocol may be for agreement on the validity of user transactions, adding blocks to the existing blockchain, interaction with external resources (e.g., off-chain), etc. The consensus protocol implemented by the blockchain network architecture 100 may be a de-centralized, leaderless block proposal mechanism that handles multiple valid block proposals concurrently and limits the submission of proposals for the existing blockchain. As an example, the blockchain network architecture 100 may use repeated subsample voting and validators may provide strong probabilistic guarantees of correctness (e.g., safety and liveness) without communicating with other validators.

Furthermore, the blockchain network architecture 100 may improve block proposal by reducing the processing load/cost associated with handling multiple block proposals concurrently and being required to select a proposal of the concurrent multiple proposals. The wrapped blockchain and referencing block header described herein may restrict proposal so as to advantageously avoid incurring additional load on the validators and latency of commitment. Multiple participants 110 may have access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices. The blockchain network architecture 100 will allow participants 110/130 to seamlessly transfer assets between chains.

The participants 130 may store data of the existing blockchain in a peer-to-peer (P2P) and/or distributed ledger fashion. In particular, the participants 130 may function in conjunction to autonomously manage the decentralized database(s) of the existing blockchain via the P2P network and a distributed timestamping server of the participants 130. The participants 130 may be configured to implement multiple chains of the blockchain network architecture 100. For example, the participants 130 can implement a plurality of chains of the blockchain network architecture 100, such as an asset blockchain (e.g., for creation of new assets, asset exchange, cross-subnet transfers), metadata blockchain (e.g., for coordinating validators, tracking active subnets, and creating new subnets), smart contract blockchain (e.g., for creating smart contracts and applications that require total ordering), etc. The plurality of chains can be validated by a primary network of the blockchain network architecture 100 that comprise all existing subnets.

A participant 110 and a server of one or more participants 130 of a computing network may access each other and other devices in the network 150 via corresponding communications modules. The communications modules may each include radio hardware and software such as RF antennas, analog circuitry, digital to analog conversion circuits, digital signal processing circuitry, and/or the like. Generally, the participant 110 and the participant 130 comprise computing devices including at least: memory storing instructions and processors configured to execute the instructions to perform, at least partially, one or more steps as described in methods disclosed herein. For example, a memory (not shown in FIG. 1) of the participant 110 may be used to perform functions associated with the blockchain platform hosted by the participant 130. The processors may be used to operate the participant 110, such as to execute applications and functions thereof rendered on the participant 110. The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

Figure 2:
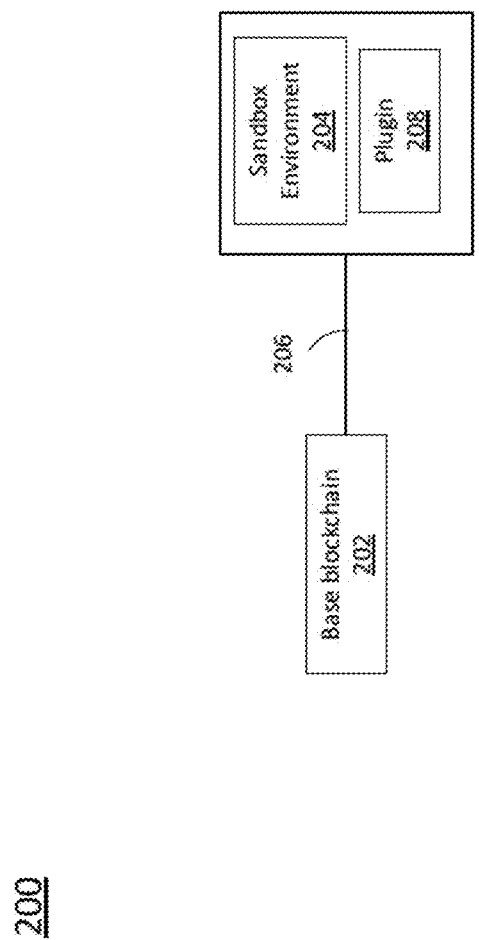
FIG. 2 is an example block diagram of an exemplary system, according to certain aspects of the present disclosure.

FIG. 2 is an example block diagram of an exemplary system 200, according to one or more embodiments. The system 200 may include a base blockchain 202 and a sandbox environment 204. The base blockchain 202 and the sandbox environment 204 may communicate via a secure message gateway 206. The system 200 allows third parties to write integrations directly into proprietary code while providing certain guarantees around the authenticity of the plugins and users are able to make sure to contain these integrations without compromising security or ease of use for the user.

According to embodiments, the base blockchain 202 includes a product (e.g., a blockchain wallet) that provides a standard set of functionalities to users of the blockchain. The sandbox environment 204 may also include a suite of additional functionalities and/or services (i.e., plugin 208) available to the users. The plugin 208 may include one or more functionalities that may be added to the product. The plugin 208 adds custom functionality to the product without introducing security risks to system 200. Users (e.g., a company, developer, or the like) may extend the standard set of functionalities of the base blockchain 202 using the plugin 208 from the sandbox environment 204. The added functionalities may be plugin computer software that adds new functions to a host program (e.g., the base blockchain 202) without altering the host program itself and achieves a blockchain network that is secure, decentralized, and scalable. The added functionalities are isolated in the sandbox environment 204 from software, programs, and functions of the base blockchain 202. The added functionalities may be sandboxed with only access allowed to certain resources, programs, and files within the base blockchain 202 or blockchain network. Sandboxing the added functionality prevents the introduction of security risks to the blockchain or blockchain network.

According to embodiments, the plugin 208 may include added functions as well as customizations to the look and feel of the product or one or more applications of the product. Users (e.g., the company, developer, or the like) may select one or more of the additional functionalities and/or customizations available in the sandbox environment 204 and add the plugin 208 corresponding to a selected function via the secure message gateway 206. The secure message gateway 206 ensures that the selected plugin from the sandbox environment 204 is authorized/accepted by the host program. That is, according to some embodiments, the additional functionalities must be compatible and authorized by the base blockchain 202 before the plugin is added. In some implementations, the selection of a service serves as authorization to allow the integration of the plugin into the product.

Figure 3:
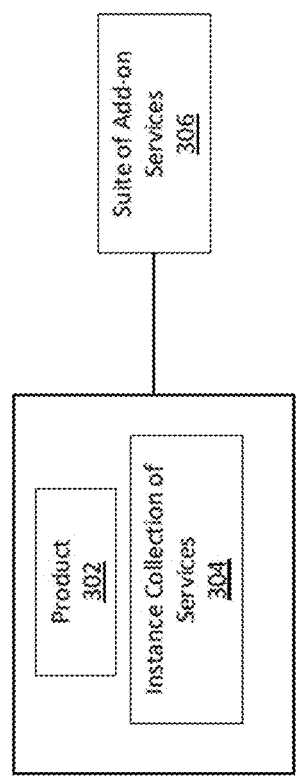
FIG. 3 is an example block diagram of an exemplary workflow for adding services to a product, according to certain aspects of the present disclosure.

FIG. 3 is an example block diagram of an exemplary workflow 300 for adding services to a product, according to one or more embodiments. The services may be one or more of the functionalities/customizations included as a plugin 208 in the sandbox environment 204. The product may correspond to the base blockchain 202.

According to some embodiments, a product 302 may include an instance collection of services 304 provided. For example, the instance collection of services 304 may include the standard set of services of the product (i.e., base application). In some implementations, the instance collection of services 304 may also include one or more previously added add-on services. The previously added add-on services may be built by the user or a third party and dropped into the user's application. Add-ons may be retrieved from, for example, a marketplace (as described with reference to FIG. 4). A user may select a service from a suite of add-on services 306. Embodiments may include generating a new version of the product. The new version of the product may be extended based on at least the selected service. In some implementation, the new version of the product may be extended to any of the services from the suite of add-on services 306. The selected service is then added to the collection of services 304 and implemented as an extension to the product. The selected service may add a functionality to the product 302 based on authorization from the user and at the user's own risk.

Based on the users' selection, embodiments may output a fully functional product that a third party can white label in the form of compiled code. The output may be stored as a new version of the product. This guarantees that the new versions that are created continue to support and use the base services (i.e., the standard set of functionalities of the product).

According to some embodiments, other applications may be integrated into the product. Those applications may exist within the product (e.g., a web-based or mobile wallet). As an example, applications may be integrated into a blockchain wallet. In some implementations, entire dApps may be embedded into the blockchain wallet. The dApps may be accessed, added, or removed via application tabs. An application tab may be a frame that allows users to add an application (such as a game) or tabs of frequently used applications. For example, users can embed a game or a lite version of a game directly into the application as a tab. The application tabs may be personalized launchpads for applications that have all the native primitive functionality (e.g., signs, send, receive, wallet addresses, connectivity, networking, etc.).

Figure 4:
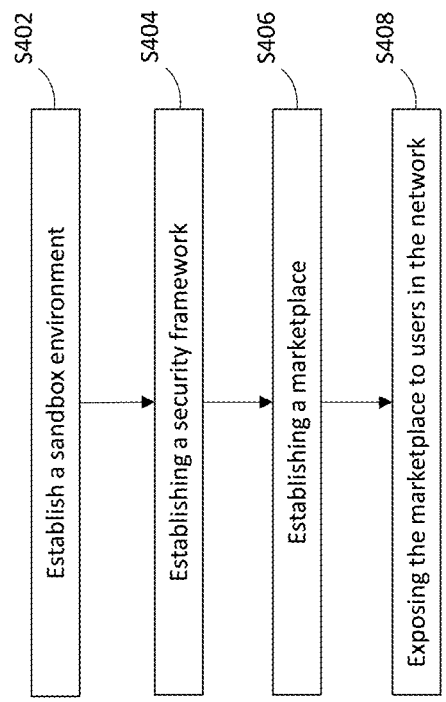
FIG. 4 is a flowchart illustrating blocks in a method for customization integration, according to certain aspects of the present disclosure.

FIG. 4 is a flowchart illustrating blocks in a method 400 for customization integration, according to some embodiments.

As shown in FIG. 4, at S402, the method 400 includes establishing a sandbox environment (e.g., sandbox environment 204). The sandbox environment provides users with a means to build and integrate customizations onto the base product or application. Any add-ons or plugins, as described herein, may be stored in the sandbox environment as a customization. The customizations may include code or a software component that adds a specific feature to the existing computer program.

At S404, the method 400 includes establishing a security framework that keeps the customizations from introducing security risks to the base product or application.

At S406, the method 400 includes establishing a marketplace. Users may register their built customizations to the marketplace. The customizations are not limited to extension but are made such that they can be dropped into any various runtime applications (e.g., Web, Extension, Mobile, etc.). The marketplace may be accessed by other users, companies, and/or developers. This enables third parties to take full advantage of the various capabilities offered across platforms. At S408, the method 400 includes exposing the marketplace to users in the network. As such, customizations are able to reach the market faster, at which point, third party users may benefit and add pre-built functionalities and customizations to their base product/application.

In some embodiments, built customizations are stored as a bundle on an agreed upon server. In some implementations, when a service is selected, an inline frame (iframe) is placed into the blockchain wallet (i.e., the product) at a prearranged entry point. When the iframe is shown, the code (corresponding to the selected service) will be requested and run in its own runtime environment associated with the blockchain wallet. Once the service is loaded, the integration will have an application programming interface (API) available to speak to the blockchain wallet. While limited, the API may allow for requesting, signing, and getting data so that the integration can display to the user correctly.

Figure 5:
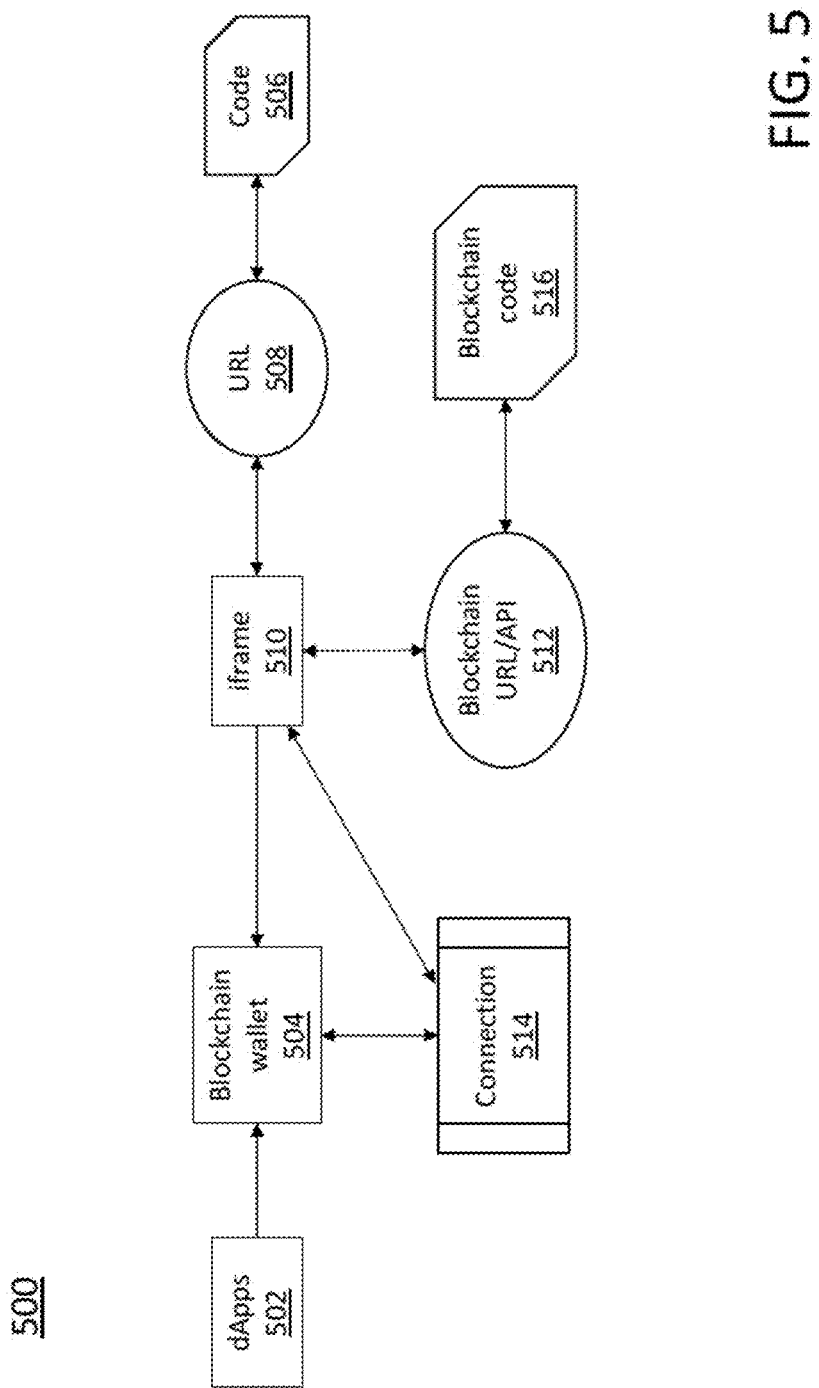
FIG. 5 is a block diagram illustrating a system for adding customizations and functionalities to a blockchain wallet, according to certain aspects of the present disclosure.

FIG. 5 is a block diagram illustrating a system 500 for adding customizations and functionalities to a blockchain wallet, according to some embodiments. As shown in FIG. 5, a dApp 502 is embedded into the blockchain wallet 504. When a plugin is selected, the plugin code 506 is fetched from a partner (e.g., sandbox environment 204). A Uniform Resource Locator (URL) 508 indicating a location of a webpage corresponding to the plugin may also be fetched from the partner. An iframe 510 is then embedded into the blockchain wallet 504. The iframe may also be embedded into a webpage of the blockchain wallet identified by a blockchain URL/API 512. This may occur when a subnet of the blockchain is selected. In some implementations, the iframe 510 is embedded at any time once a plugin or extension is opened or selected. This will allow the fetched code to run in its own context and out of the scope of the code running the blockchain wallet. The blockchain wallet 504 and the iframe 510 may be connected at a connection 514. The connection 514 may be a limited API which the blockchain URL/API 512 exposes to the iframe 510 which will define parameters for what is allowed and what is not allowed. This allows the plugin code 506 from the partner to integrate and secure to the blockchain wallet 504. The connection 514 may be limited by the blockchain wallet based on predetermined parameters and may use an API to communicate with the iframe 510. Blockchain code 516 may be fetched from the blockchain wallet 504 based on the blockchain URL/API 512.

Figure 6:
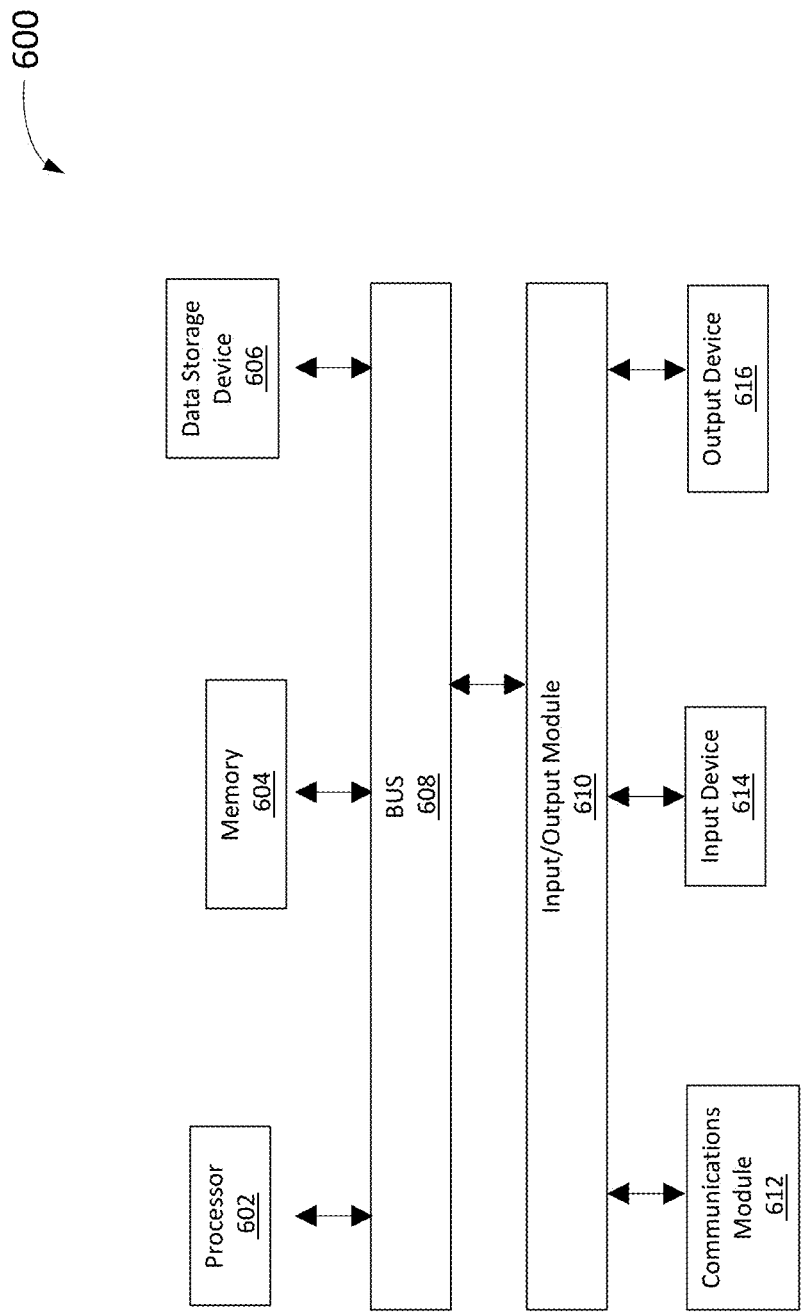
FIG. 6 is a block diagram illustrating an exemplary computer system with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

The computer system 600 (e.g., server and/or client) includes a bus 608 or other communication mechanism for communicating information, and a processor 602 coupled with the bus 608 for processing information. By way of example, the computer system 600 may be implemented with one or more processors 602. Each of the one or more processors 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by the processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 600 further includes a data storage device 606 such as a magnetic disk or optical disk, coupled to bus 608 for storing information and instructions. The computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described systems can be implemented using a computer system 600 in response to the processor 602 executing one or more sequences of one or more instructions contained in the memory 604. Such instructions may be read into memory 604 from another machine-readable medium, such as data storage device 606. Execution of the sequences of instructions contained in the main memory 604 causes the processor 602 to perform the process steps described herein. One or more processors in a multi-processing arrangement may also be employed to execute the sequences of instructions contained in the memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 600 can include clients and servers. A client and server are generally remote from each other and typically interact through a communication network. The relationship of client and server arises by virtue of computer programs running on the respective computers and having a client-server relationship to each other. The computer system 600 can be, for example, and without limitation, a desktop computer, laptop computer, or tablet computer. The computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 602 for execution. Such a medium may take many forms, including, but not limited to, non-volatile media, volatile media, and transmission media. Non-volatile media include, for example, optical or magnetic disks, such as the data storage device 606. Volatile media include dynamic memory, such as the memory 604. Transmission media include coaxial cables, copper wire, and fiber optics, including the wires that comprise the bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Figure 7:
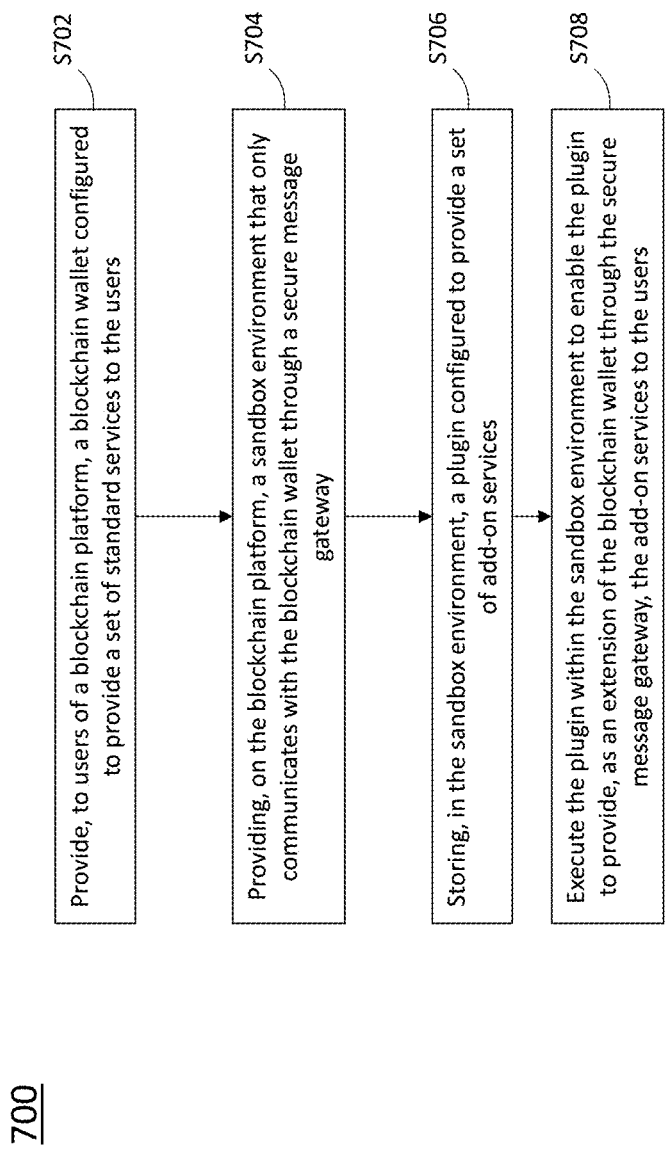
FIG. 7 is a flowchart illustrating a process for customizing and extending a blockchain wallet, according to some embodiments.

FIG. 7 is a flowchart illustrating a process 700 for customizing and extending a blockchain wallet, according to some embodiments.

At S702, the process 700 provides, to users of a blockchain platform, a blockchain wallet configured to provide a set of standard services to the users.

At S704, the process 700 provides on the blockchain platform, a sandbox environment that only communicates with the blockchain wallet through a secure message gateway. In some embodiments, the plugin includes an application programming interface to communicate with the blockchain wallet. From the sandbox, the plugin may have limited access to resources, programs, and files of the blockchain wallet.

At S706, the process 700 stores, in the sandbox environment, a plugin configured to provide a set of add-on services. In some embodiments, the plugin is selected by a user, for example from a plurality of plugins in a marketplace. The add-on services may include functions and customizations to one or more applications (e.g., decentralized applications, or dApps) of the blockchain wallet.

At S708, the process 700 executes the plugin within the sandbox environment to enable the plugin to provide, as an extension of the blockchain wallet through the secure message gateway, the add-on services to the users. In some embodiments, the process 700 requires authorization before executing the plugin within the sandbox environment.

In some embodiments, the blockchain wallet includes a first user interface, the plugin includes a second user interface, the first user interface includes an inline frame, and the inline frame displays the second user interface. The process 700 may execute the plugin in the sandbox environment in response to displaying the inline frame within the first user interface.

In some embodiments, the process 700 generates a new blockchain wallet by integrating the plugin to the original blockchain wallet and providing the new blockchain wallet to the users of the blockchain platform. Since the new blockchain wallet integrates the plugin with the original wallet, the new blockchain wallet is configured to provide to the users both the standard services and the add-on services. In some embodiments, the new blockchain wallet is generated by compiling the original blockchain wallet and the plugin. In some embodiments, the process 700 further receives user authorization for (and prior to) integrating the plugin to the blockchain wallet.

In some embodiments, the process 700 further includes embedding one or more decentralized applications (dApps) into the blockchain wallet. The dApps may be displayed as corresponding application tabs in a user interface of the blockchain wallet.

Figure 8:
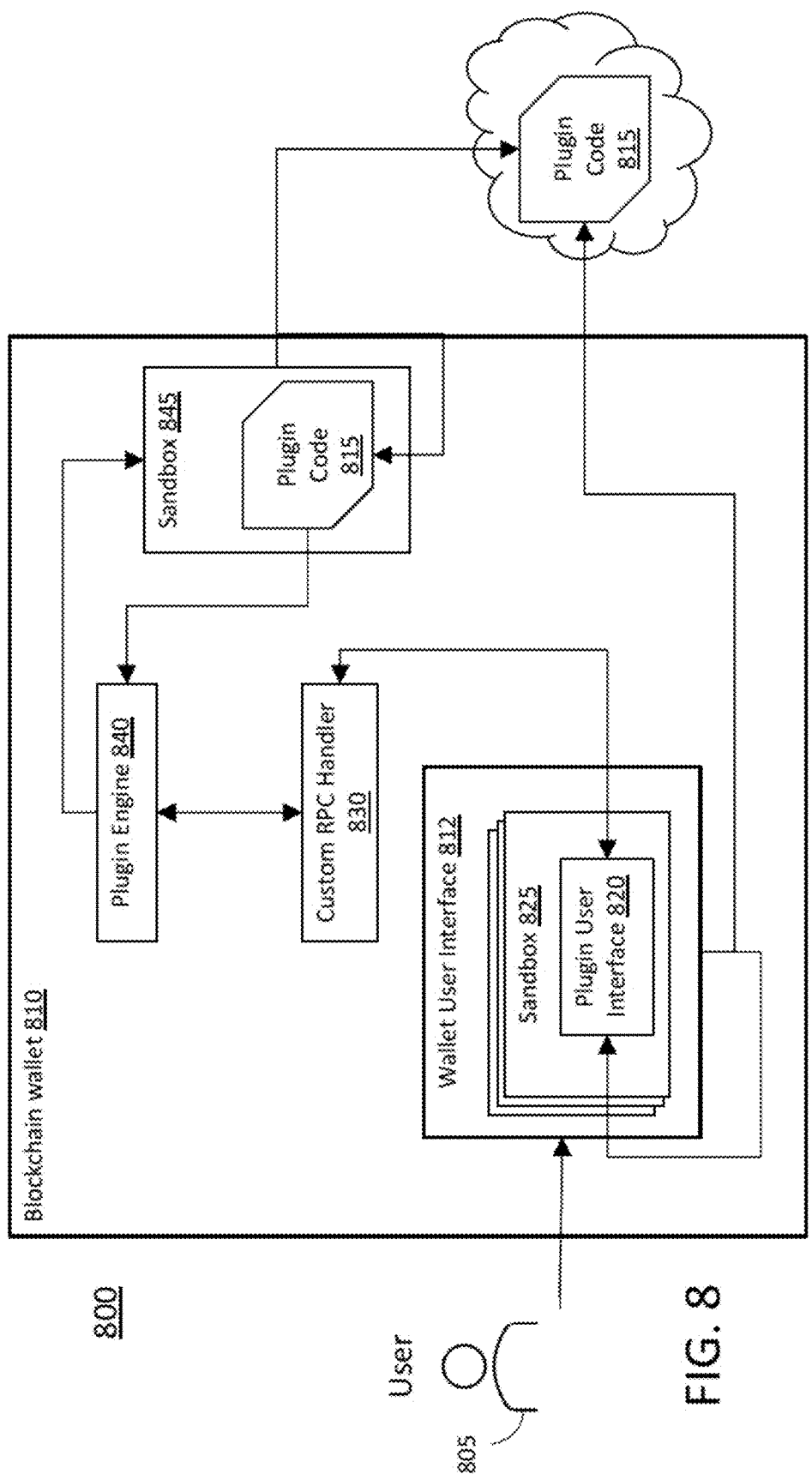
FIG. 8 shows a system for customizing and extending a blockchain wallet, according to some embodiments.

FIG. 8 shows a system 800 for customizing and extending a blockchain wallet, according to some embodiments. The system 800 includes a user 805 who interacts with a blockchain wallet 810 having a user interface 812, that retrieves plugin code 815 (e.g., source code, executable code, a script, and the like) from an external source over a public network (e.g., the internet, a wide area network, and the like). When the user 805 opens the blockchain wallet 810, the wallet's user interface 812 loads the plugin's user interface 820. In some embodiments, the plugin's user interface 820 is previously loaded and extension points of the wallet's user interface 812 are pre-defined. The extension points may be defined by settings of the blockchain wallet 810. The blockchain wallet 810 may verify the integrity of the plugin code 815 before displaying.

In this example, the wallet's user interface 812 displays the plugin's user interface 820 within a sandbox 825. The plugin's user interface 820 then may make a custom Remote Procedure Call (RPC) that is defined by the plugin code 815, to a custom RPC handler 830. The RPC handler 830 calls a plugin engine 840 to execute the RPC if the plugin code 815 has been registered.

The plugin engine 840 creates a sandbox 845, which executes a script (not shown) within a sandboxed HTML page. The script configures the sandbox 845 to load the plugin code 815 and may also check the plugin code's integrity. Upon verifying the integrity of the plugin code 815, the sandbox executes the plugin code 815 and returns the result of executing the plugin code 815 to the plugin engine 840. The plugin engine 840 provides the result to the RPC handler 830, which returns the result to the plugin's user interface 820 to be displayed.

Figure 9:
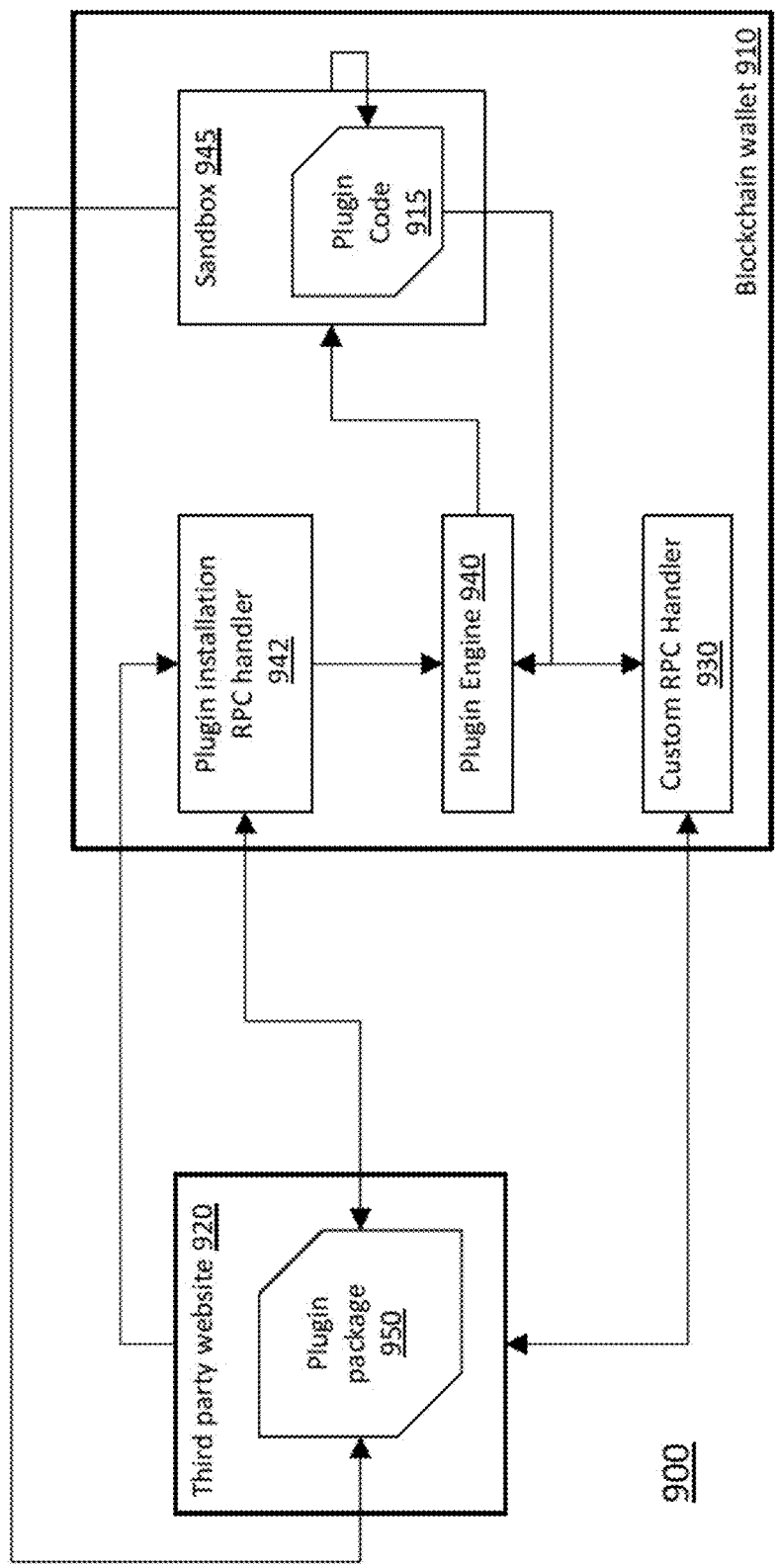
FIG. 9 shows a system for customizing and extending a blockchain wallet, according to some embodiments.

FIG. 9 shows another example of a system 900 for customizing and extending a blockchain wallet, according to some embodiments. In this example, a blockchain wallet is extended and customized with a plugin, but without requiring the plugin to have a user interface that requires its own sandbox environment. The system 900 is similar to the embodiment of the system 800 discussed above with respect to FIG. 8, and like reference numerals have been used to refer to the same or similar components. A detailed description of these components will be omitted, and the following discussion focuses on the differences between these embodiments. Any of the various features discussed with any one of the embodiments discussed herein may also apply to and be used with any other embodiments.

The system 900 includes a blockchain wallet 910 that executes plugin code 915 (e.g., source code, executable code, a script, and the like) from a third party website 920 over a public network (e.g., the internet, a wide area network, and the like). The blockchain wallet 910 includes a custom RPC handler 930 and a plugin engine 940, as well as a plugin installation RPC handler 942. The plugin code 915 is executed within a sandbox 945.

In this example, the plugin installation RPC handler 942 retrieves and installs a plugin package 950 (e.g., a manifest, additional files, resources, etc.). The plugin installation RPC handler 942 may be provided a URL of the plugin package 950 and uses that URL to retrieve the plugin package 950. The plugin installation RPC handler 942 loads and stores the plugin in a registry of the plugin engine 940. The plugin package 950 may also include a plugin script used by the plugin engine 940 to automate aspects of loading and instantiating the plugin code 915, as described below.

The third party website 920 then may make a custom remote procedure call (RPC), that was previously defined by the plugin, to the RPC handler 930. The RPC handler 930 then calls the plugin engine 940 to execute the RPC call, after verifying that the plugin has been registered (e.g., installed in the registry of the plugin engine 940).

The plugin engine 940 creates the sandbox 945, which executes the plugin script (not shown) within a sandboxed HTML page. The script configures the sandbox 945 to load the plugin code 915 and may also check the plugin code's integrity prior to execution. Within the sandbox 945, only information defined by the plugin's permissions are exposed to the plugin code 915, such as but not limited to address information, network information, and storage information.

The sandbox 945 loads the plugin code 915, and upon successful verification of integrity, executes the plugin code 815. The sandbox 945 returns the result of executing the plugin code 915 to the plugin engine 940. The plugin engine 940 provides the result to the RPC handler 930, which returns the result to the third party website 920 to be displayed.

Embodiments consistent with the present disclosure may include the computer-implemented method of clause 1, combined with any of the following elements, in any number and permutation thereof.

Clause 1: A computer-implemented method, according to one or more embodiments, includes generating a sandbox environment isolated from a blockchain wallet in a network, identifying one or more plugins, wherein the one or more plugins include code for additional functionalities and/or services, receiving a selection of at least one of the one or more plugins, generating a new version of the blockchain wallet by integrating the at least one plugin to the blockchain wallet based on the selection via a secure message gateway as an extension to the blockchain wallet, generating a marketplace including the one or more plugins, and exposing the marketplace to the network.

Element 1, wherein the one or more plugins may be created by a user of the blockchain wallet or a third party. Element 2, wherein the one or more plugins are stored in the sandbox environment. Element 3, wherein the method includes exposing the new version of the blockchain wallet to the network. Element 4, wherein the one or more plugins have limited access to certain resources, programs, and files within the blockchain wallet. Element 5, wherein plugins, when integrated into the blockchain wallet, add functions and customizations to the one or more applications of the blockchain wallet. Element 6, wherein the method includes requiring authorization before integrating the plugin. Element 7, wherein the method includes receiving user authorization for integrating the at least one plugin to the blockchain wallet. Element 8, wherein the method includes outputting the new version of the blockchain wallet, wherein the new version of the blockchain wallet is a fully functioning product with the blockchain wallet as the base application. Element 9, wherein embedding dApps into the blockchain wallet and displaying the embedded dApps as application tabs in a blockchain wallet interface. Element 10, wherein the application tabs are personalized launchpads for applications that have native primitive functionalities.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The invention claimed is:

1. A method for customizing a blockchain wallet, comprising:
   providing, to a plurality of users of a blockchain platform, the blockchain wallet configured to provide a first plurality of standard blockchain wallet services to the plurality of users;
   providing, within the blockchain wallet, a sandbox environment;
   retrieving from a third-party website based on a uniform resource locator (URL), a wallet plugin configured to provide a second plurality of add-on blockchain wallet services; and
   executing the wallet plugin within the sandbox environment of the blockchain wallet to enable the wallet plugin to provide, as an extension of the blockchain wallet, the second plurality of add-on blockchain wallet services to the plurality of users.

2. The method of claim 1, wherein the wallet plugin comprises an application programming interface to communicate with the blockchain wallet.

3. The method of claim 1, wherein the blockchain wallet comprises a first user interface, the wallet plugin comprises a second user interface, the first user interface comprises an inline frame, and the inline frame displays the second user interface.

4. The method of claim 3, further comprising executing the wallet plugin in the sandbox environment in response to displaying the inline frame within the first user interface.

5. The method of claim 1, wherein the blockchain wallet is a first blockchain wallet, the method further comprising generating a second blockchain wallet by integrating the wallet plugin to the first blockchain wallet and providing the second blockchain wallet to the plurality of users of the blockchain platform, wherein the second blockchain wallet is configured to provide to the plurality of users both the first plurality of standard blockchain wallet services and the second plurality of add-on blockchain wallet services.

6. The method of claim 5, wherein the second blockchain wallet is generated by compiling the first blockchain wallet and the wallet plugin.

7. The method of claim 1, wherein the method further comprises receiving user authorization for integrating the wallet plugin to the blockchain wallet.

8. The method of claim 1, wherein the wallet plugin is selected by a user from a plurality of wallet plugins in a marketplace.

9. The method of claim 1, wherein the wallet plugin has limited access to resources, programs, and files of the blockchain wallet.

10. The method of claim 1, wherein the second plurality of add-on blockchain wallet services comprise functions and customizations to one or more applications of the blockchain wallet.

11. The method of claim 1, wherein the method further comprises requiring authorization before executing the wallet plugin within the sandbox environment.

12. The method of claim 1, further comprising:
   embedding a plurality of decentralized applications into the blockchain wallet; and
   displaying the embedded plurality of decentralized applications as corresponding application tabs in a user interface of the blockchain wallet.

13. The method of claim 1, wherein the blockchain platform comprises the blockchain wallet and a plurality of blockchains, the plurality of blockchains comprising one or more of a component exchange blockchain for creating and trading digital smart assets, a metadata blockchain for coordinating validator nodes and managing subnets, and a contract blockchain for creating smart contracts across the blockchain platform.

14. A non-transitory computer-readable medium storing a program for customizing a blockchain wallet, which when executed by a computer, configures the computer to:
   provide, to a plurality of users of a blockchain platform, the blockchain wallet configured to provide a first plurality of standard blockchain wallet services to the plurality of users;
   provide, within the blockchain wallet, a sandbox environment that retrieves from a third-party website based on a uniform resource locator (URL), a wallet plugin configured to provide a second plurality of add-on blockchain wallet services; and execute the wallet plugin within the sandbox environment of the blockchain wallet to enable the wallet plugin to provide, as an extension of the blockchain wallet, the second plurality of add-on blockchain wallet services to the plurality of users.

15. The non-transitory computer-readable medium of claim 14, wherein the wallet plugin comprises an application programming interface to communicate with the blockchain wallet, and the wallet plugin has limited access to resources, programs, and files of the blockchain wallet.

16. The non-transitory computer-readable medium of claim 14, wherein the blockchain wallet comprises a first user interface, the wallet plugin comprises a second user interface, the first user interface comprises an inline frame, and the inline frame displays the second user interface, and the program, when executed by the computer, further configures the computer to execute the wallet plugin in the sandbox environment in response to displaying the inline frame within the first user interface.

17. The non-transitory computer-readable medium of claim 14, wherein the blockchain wallet is a first blockchain wallet, and the program, when executed by the computer, further configures the computer to generate a second blockchain wallet by integrating the wallet plugin to the first blockchain wallet and providing the second blockchain wallet to the plurality of users of the blockchain platform, wherein the second blockchain wallet is configured to provide to the plurality of users both the first plurality of standard blockchain wallet services and the second plurality of add-on blockchain wallet services.

18. The non-transitory computer-readable medium of claim 17, wherein the second blockchain wallet is generated by compiling the first blockchain wallet and the wallet plugin.

19. The non-transitory computer-readable medium of claim 14, wherein the wallet plugin is selected by a user from a plurality of wallet plugins in a marketplace.

20. The non-transitory computer-readable medium of claim 14, wherein the program, when executed by the computer, further configures the computer to:

embed a plurality of decentralized applications into the blockchain wallet; and display the embedded plurality of decentralized applications as corresponding application tabs in a user interface of the blockchain wallet.

21. The non-transitory computer-readable medium of claim 14, wherein the blockchain platform comprises the blockchain wallet and a plurality of blockchains, the plurality of blockchains comprising one or more of a component exchange blockchain for creating and trading digital smart assets, a metadata blockchain for coordinating validator nodes and managing subnets, and a contract blockchain for creating smart contracts across the blockchain platform.

22. A system for customizing a blockchain wallet, comprising:

a processor; and a non-transitory computer readable medium storing a set of instructions, which when executed by the processor, configure the processor to:

provide, to a plurality of users of a blockchain platform, the blockchain wallet configured to provide a first plurality of standard blockchain wallet services to the plurality of users;

provide, within the blockchain wallet, a sandbox environment that retrieves from a third party website based on a uniform resource locator (URL), a wallet plugin configured to provide a second plurality of add-on blockchain wallet services; and execute the wallet plugin within the sandbox environment of the blockchain wallet to enable the wallet plugin to provide, as an extension of the blockchain wallet, the second plurality of add-on blockchain wallet services to the plurality of users.

* * * * *